(12) United States Patent
Tomov

(10) Patent No.: US 12,534,191 B1
(45) Date of Patent: Jan. 27, 2026

(54) REDUCING INDUCED DRAG BY CREATING ADDITIONAL AIRFLOW AT THE WING TIP

(71) Applicant: Kiril Iliev Tomov, Sofia (BG)

(72) Inventor: Kiril Iliev Tomov, Sofia (BG)

( * ) Notice: Subject to any disclaimer, the term of this patent is extended or adjusted under 35 U.S.C. 154(b) by 0 days.

(21) Appl. No.: 17/977,457

(22) Filed: Oct. 31, 2022

(51) Int. Cl.
*B64C 23/06* (2006.01)

(52) U.S. Cl.
CPC .................................. *B64C 23/065* (2013.01)

(58) Field of Classification Search
CPC ............................. B64C 23/06; B64C 23/065
See application file for complete search history.

(56) References Cited

U.S. PATENT DOCUMENTS

| | | | | |
|---|---|---|---|---|
| 2,075,817 | A | * 4/1937 | Loerke | B64C 23/065 244/130 |
| 3,841,587 | A | * 10/1974 | Freed | B64C 23/06 415/914 |
| 3,997,132 | A | * 12/1976 | Erwin | B64C 23/065 244/55 |
| 5,348,253 | A | 9/1994 | Gratzer | |
| 6,970,773 | B2 | 11/2005 | Phillips | |
| 8,366,056 | B2 | 2/2013 | Garang | |
| 2008/0308683 | A1 | 12/2008 | Sankrithi et al. | |
| 2010/0059624 | A1 | 3/2010 | Fol et al. | |
| 2016/0340029 | A1 | 11/2016 | Williams | |
| 2018/0237128 | A1 | 8/2018 | Commis et al. | |

OTHER PUBLICATIONS

Md Fazle Rabbi, St Mary's University, Twickenham; Rajesh Nandi, Purdue University; Mohammad Mashud: Induce drag reduction of an airplane wing, Jun. 2015, American Journal of Engineering Research 4(6):219-223.
Larson, George C., *How Things Work: Winglets*, Sep. 2001 (7 pages).
Verrastro, Maurizio et al., Morphing Wing Technologies, 2018, 2.3 Morphing Winglet.
Sforza, Pasquale, Commercial Airplane Design Principles, 2014, 5.7.8 Raked wingtips (2 pages).
Skorpik, Jiri, Flow Of Gases And Steam Through Nozzles, Feb. 2006 (19 pages).
De Laval nozzle, from Wikipedia (6 pages).
De Laval nozzle, Citizendium Discussion (3 pages).

\* cited by examiner

*Primary Examiner* — Ashesh Dangol
(74) *Attorney, Agent, or Firm* — Alston & Bird LLP

(57) ABSTRACT

Reduction of the induced drag by placing a convergent-divergent nozzle at the wingtip which creates an additional airflow with a velocity greater than the airflow velocity around the wing, which changes the nature and direction of the airflow along the upper and lower surfaces at the wingtip, thus forming a new vortex of lesser intensity, which is shifted to the sides of the wingtip, creating conditions for better airflow, less induced drag, and greater aerodynamic force.

12 Claims, 8 Drawing Sheets

Formation of the vortex at the end of the wing

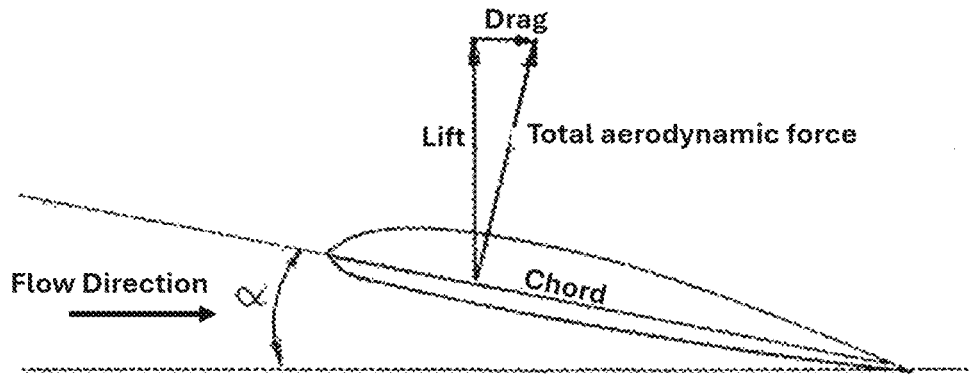
Fig. 1. Aerodynamic forces at circulation of the wing airfoil
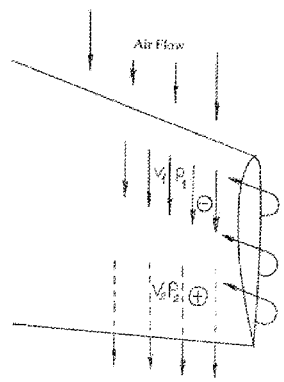
Fig.2. Emergence of the induced drag
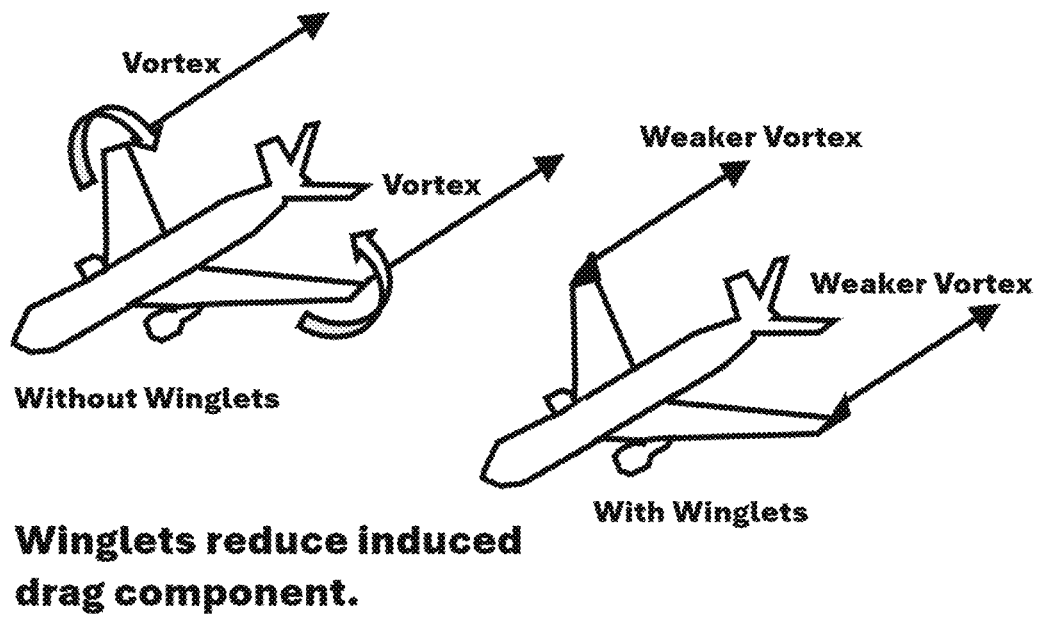
Fig.3. Location of winglets

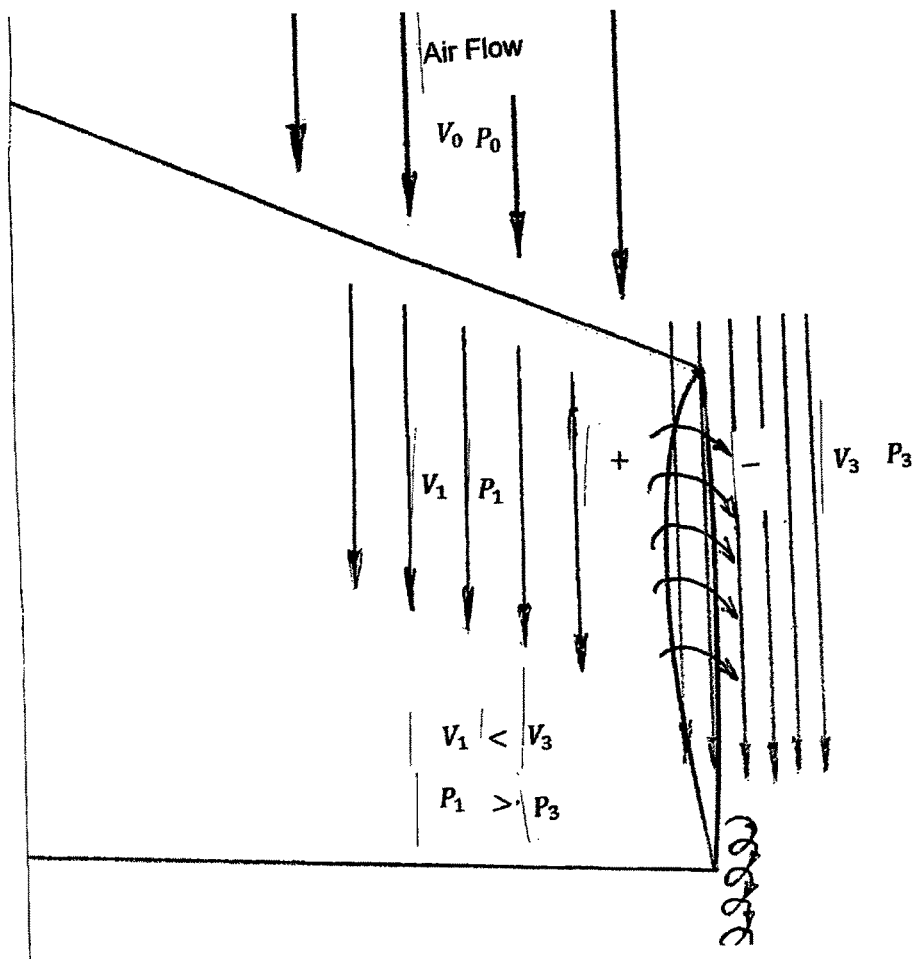
Fig.4. Vortex created by the new flow and by the circulation of the upper surface of the wing

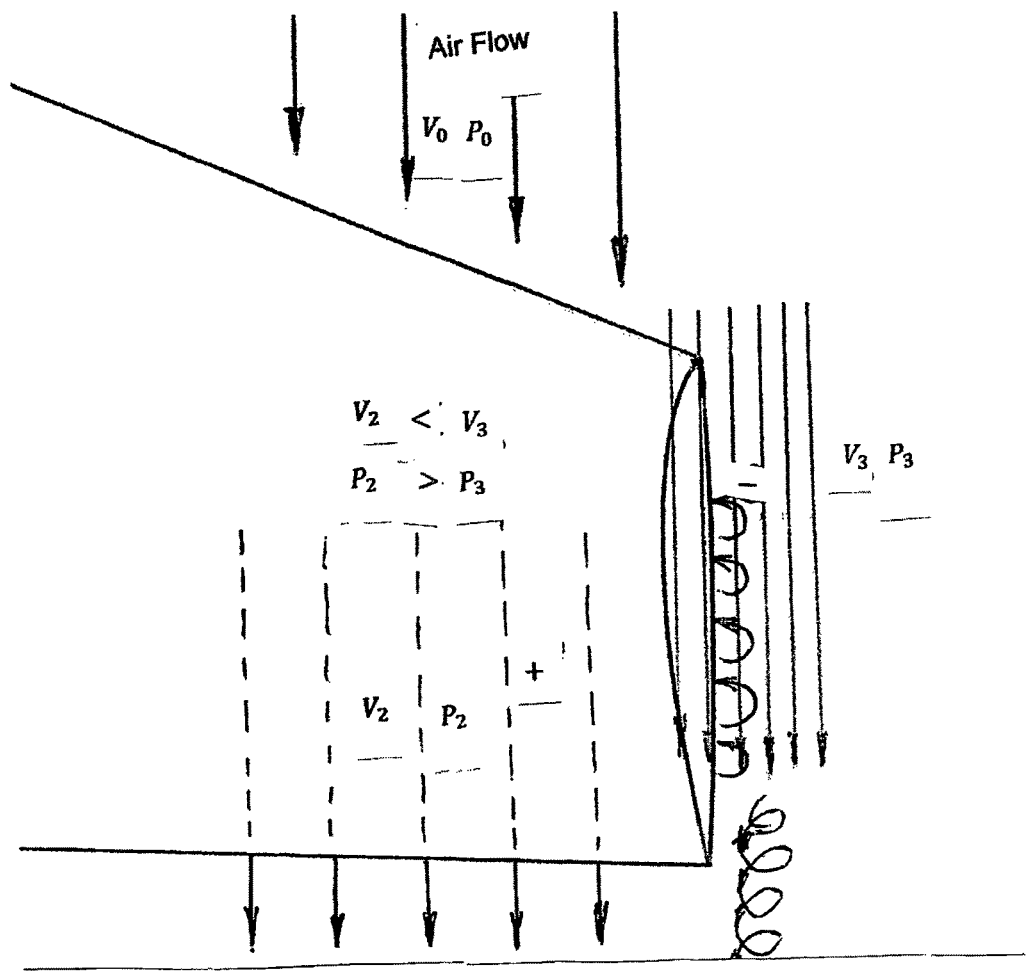
Fig.5. Vortex created by the new flow and by the sweep of the lower surface of the wing

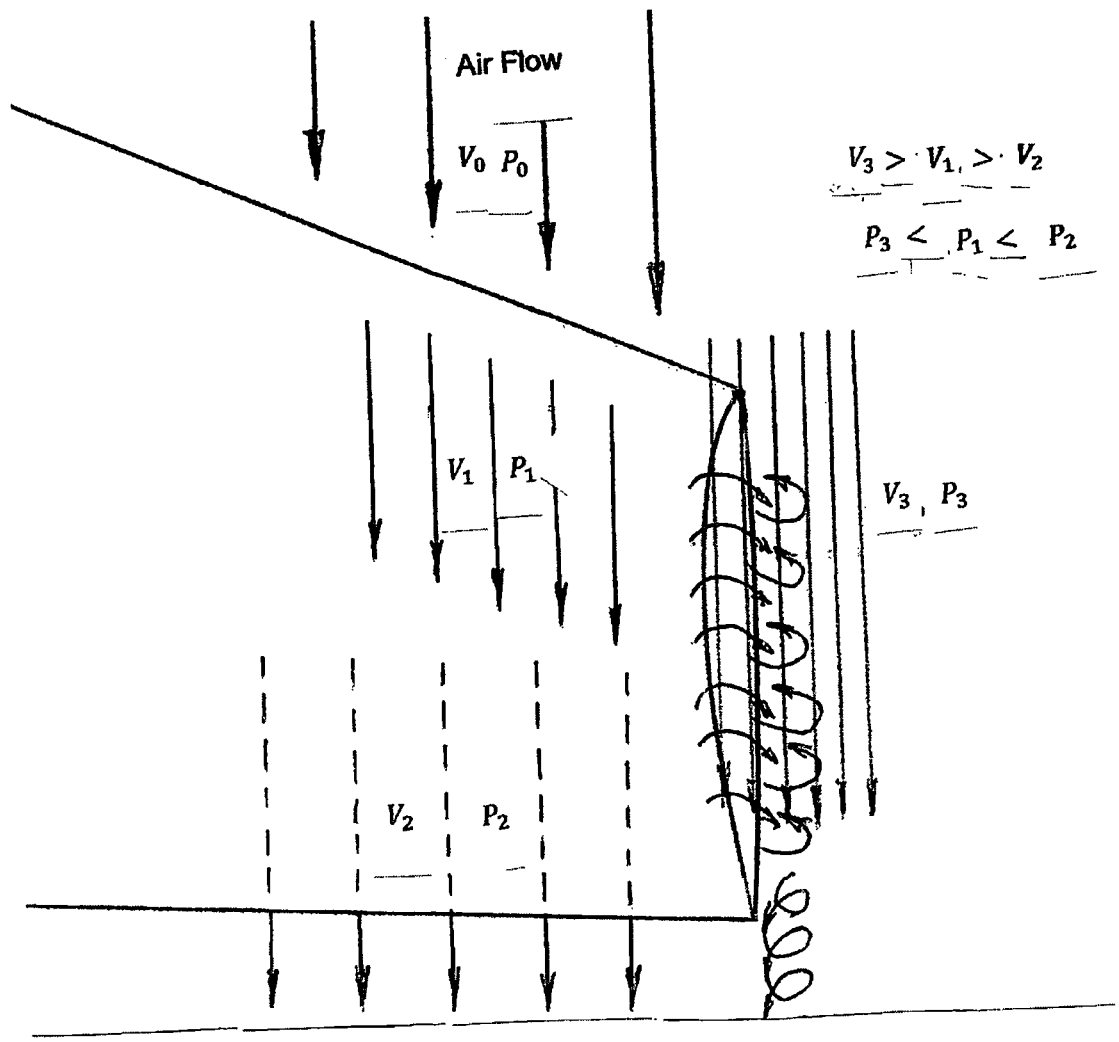
Fig.6. Vortex created at the end of the wing

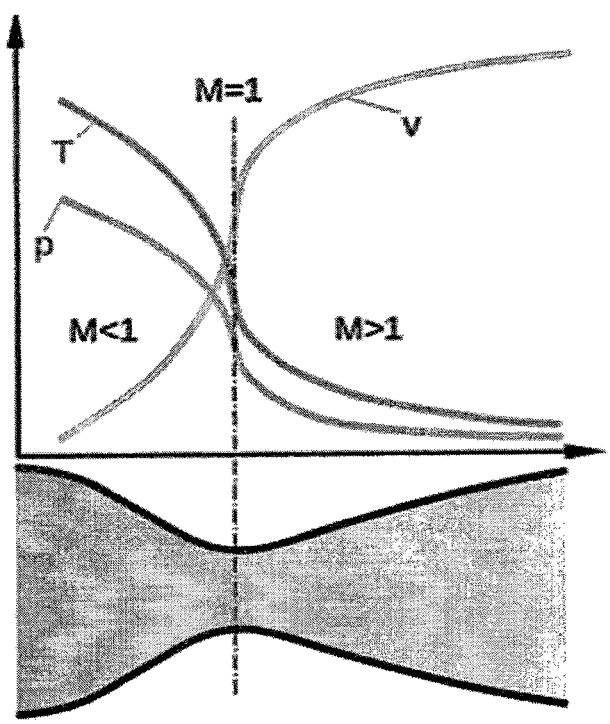
Fig.7. de Laval nozzle and the variation of flow parameters along the pipe(https://en.wikipedia.)

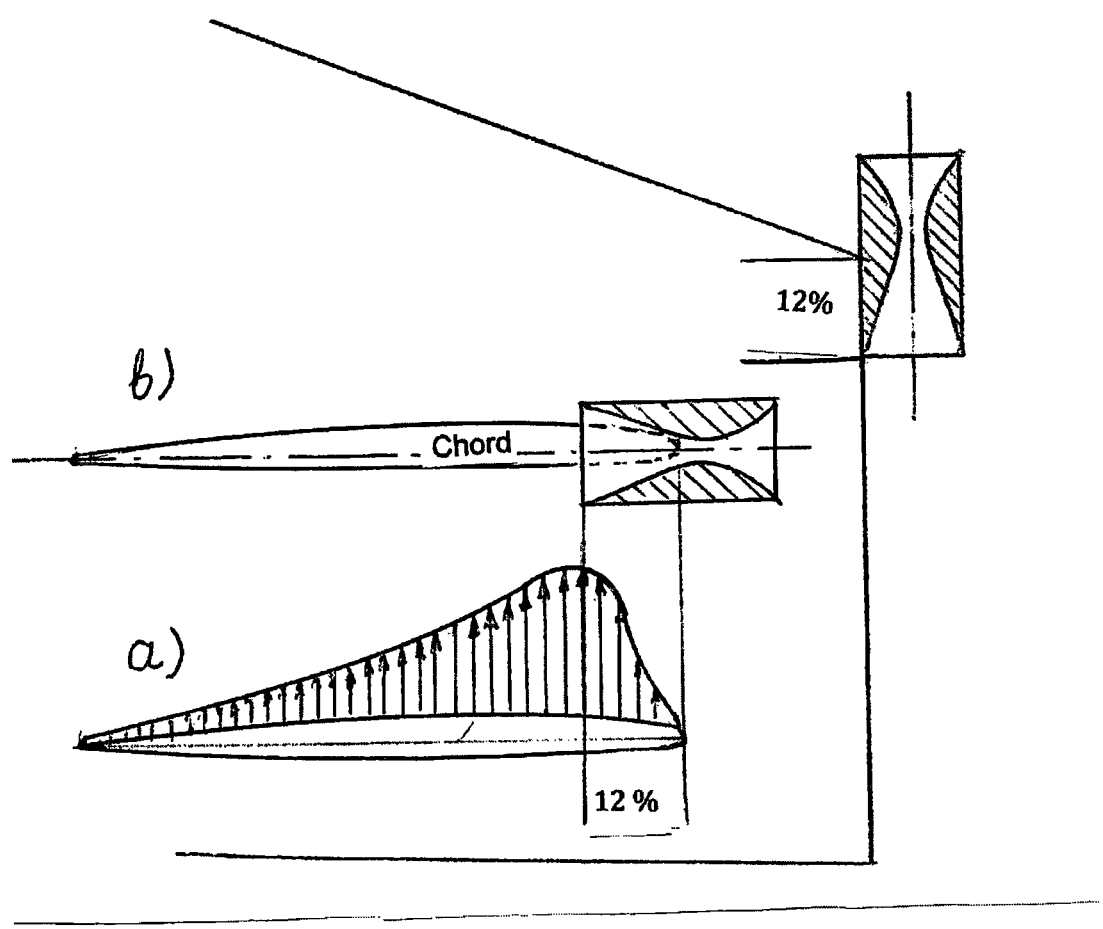
Fig.8. Nozzle placement at the end of the wing

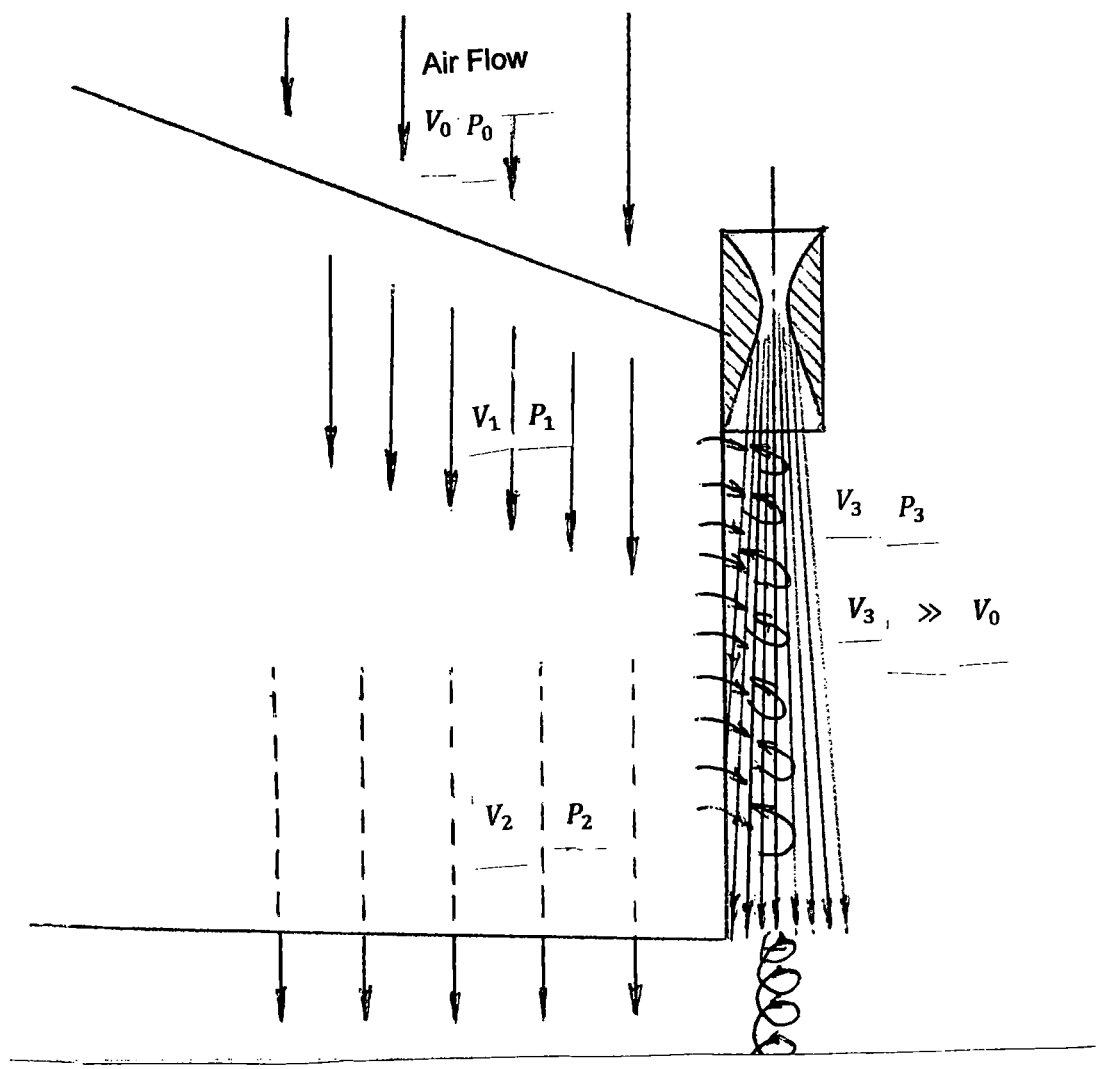
Fig.9. Formation of the vortex at the end of the wing

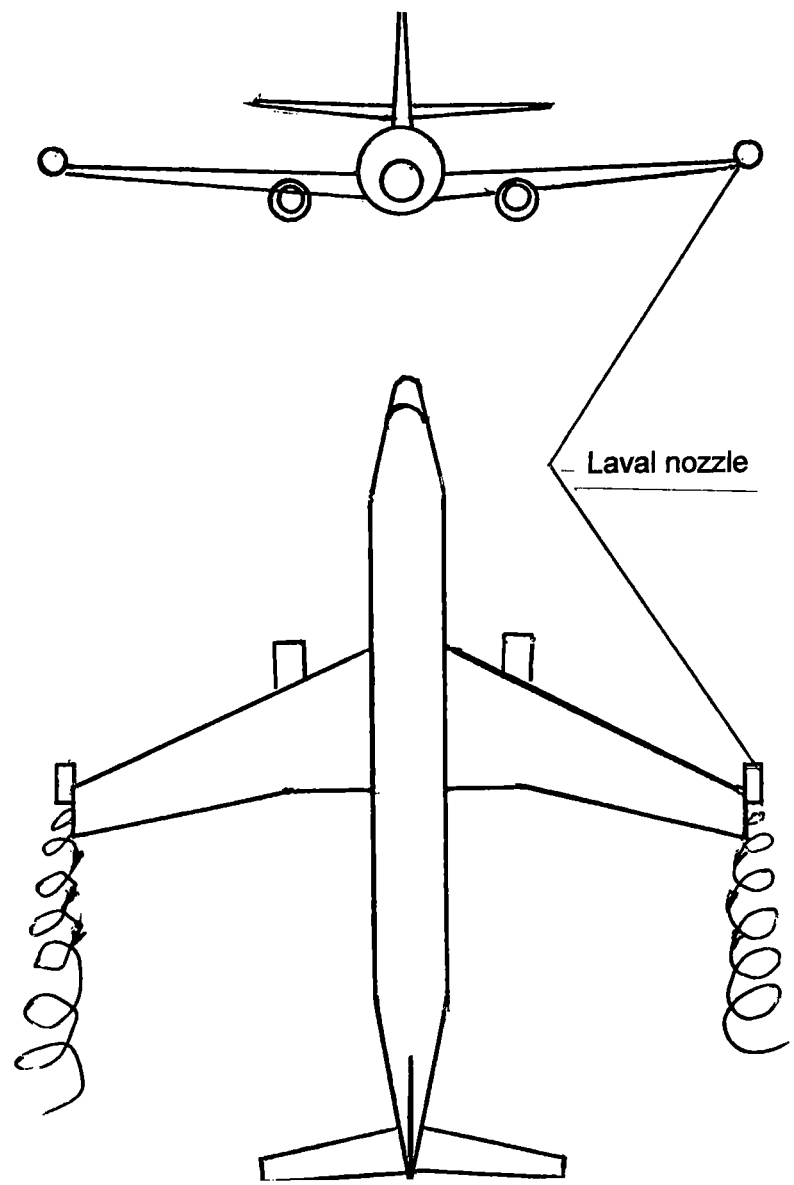
Fig.10. Design of the nozzle placement at the wing tip

REDUCING INDUCED DRAG BY CREATING ADDITIONAL AIRFLOW AT THE WING TIP

CROSS-REFERENCE TO RELATED APPLICATIONS

The invention is an alternative to winglets and applies to all types of transport aircrafts with subsonic flight speed.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

In the actual flight conditions of the aircraft, where the wing is of finite length, in addition to the aerodynamic force associated with the wrap-around airfoil, secondary aerodynamic forces arise due to the pressure difference across the lower and upper surfaces of the wing. As a result, a vortex is formed at the wing tip creating additional drag which reduces the aerodynamic efficiency of the wing and is known as induced drag.

Theoretical and experimental studies have established that the elongation of the wing and its special shaping at the end, leads to a reduction in induced drag. For this reason, on modern aircraft the wing tips are often bent upwards, thus forming so-called winglets, which cause the vortex to be torn and distributed vertically, causing it to shift from the wing tip to the winglet and reducing its intensity.

The disadvantage of this solution is that there are no universal winglets that are suitable for every aircraft, so they are always designed for each specific aircraft, depending on the area of the flight where it spends the longest time. On the other hand, winglets practically increase the wing area, which leads to an increase in aerodynamic drag and in the total weight of the aircraft. All this reduces the effect of the reduction of induced drag.

BRIEF SUMMARY OF THE INVENTION

The invention relates to the creation of conditions for reducing induced drag from wing sweep during flight of an aircraft.

If we create an additional flow at the end of the wing, with a velocity greater than the wing's sweep rate, three flows will meet in the three-dimensional space at the end of the wing, caused by the pressure differences in the new flow and those above and below the wing. The flow on the upper surface of the wing will be in an inward-outward direction, thereby creating conditions for a smooth circulation of the entire wing and forming a vortex together with the new flow /FIG. 4/. The flow from the lower surface of the wing will also be directed outwards and will form a second vortex /FIG. 5/. As a result, a vortex will form at the end of the wing, outboard of the end of the wing, which will be less intense as the two vortices have opposite directions of rotation /FIG. 6/.

A high velocity flow can be created by a de Laval nozzle placed in a suitable location at the end of the wing /FIG. 8/. The nozzle is a convergent-divergent tube in which the gas at the inlet contracts, increasing its velocity, then expands and increases its velocity again due to the increase in kinetic energy of the flow on account of the pressure drop in the expanding section /FIG. 7/.

The altered wake at the end of the wing caused by the new flow will create conditions for better wake around the entire wing, and therefore more lift and less induced drag /FIG. 9/.

The advantage of the new method is that it does not change the geometry of the wing and its aerodynamic characteristics, replaces the winglets, which are more complex, increase the wing area, and thus cause greater aerodynamic drag and more weight /FIG. 10/.

BRIEF DESCRIPTION OF THE SEVERAL VIEWS OF THE DRAWINGS

FIG. 1. Aerodynamic forces at circulation of the wing airfoil
FIG. 2. Emergence of the induced drag
FIG. 3. Location of winglets
FIG. 4. Vortex created by the new flow and by the circulation of the upper surface of the wing
FIG. 5. Vortex created by the new flow and by the sweep of the lower surface of the wing
FIG. 6. Vortex created at the end of the wing
FIG. 7. de Laval nozzle and the variation of flow parameters along the pipe (https://en.wikipedia.)
FIG. 8. Nozzle placement at the end of the wing
FIG. 9. Formation of the vortex at the end of the wing
FIG. 10. Design of the nozzle placement at the wing tip

DETAILED DESCRIPTION OF THE INVENTION

The aerodynamic airfoil of an aircraft wing is generally flat-convex and is swept by the airflow at different speeds along the back and belly of the airfoil. According to Bernoulli's equation, for a continuous flow, $$\rho \frac{V^2}{2} + p_{st} = const,$$

i.e. the sum of the dynamic and static pressures at different points is a constant quantity. This means that the greater the velocity at one point in the flow, the less the static pressure there. Due to the different flow velocities at the back and at the belly of the airfoil, an upward aerodynamic force occurs perpendicular to the airfoil chord /FIG. 1/.

In the actual flight conditions of the aircraft where the wing is of finite length, in addition to the aerodynamic force associated with the wing airfoil wrap, a secondary aerodynamic force occurs. The higher pressure on the lower surface of the wing creates a lateral airflow, out towards the wing tip, due to the relatively lower air pressure above the wing. This flow, mixed with the higher velocity flight airflow, swirls and forms a vortex at the wing tip creating additional drag known as induced drag, which reduces the aerodynamic efficiency of the wing /FIG. 2/.

Theoretical and experimental studies have established that the elongation of the wing and its special shaping at the end, leads to a reduction in induced drag. For this reason, the wing tips of modern aircraft are often bent upwards, thus forming the so-called winglets /FIG. 3/. The winglets cause the vortex to tear and spread vertically, causing the vortex to shift from the wing tip to the winglet, where it appears in a weaker form. This vortex has a lower spin rate and less kinetic energy and thus reduces induced drag. The shape, size, incline, and other parameters of the winglet are tailored to the overall wing design and the prevailing flight regime, which is why there are so many different winglet designs on different aircraft.

As a disadvantage of this solution to the problem, it can be noted that there are no universal winglets that are suitable for every aircraft. Rather, the interaction of a myriad of complex factors related to the geometry and aerodynamics of the aircraft leads to the appropriate and optimal winglet. Therefore, winglets are always designed for each specific aircraft, depending on the area of flight in which it spends the longest time. On the other hand, winglets practically increase the wing area, which leads to an increase in aerodynamic drag and in the total weight of the aircraft. All this reduces the effect of the reduction of induced drag.

If we create additional flow at the end of the wing, at velocity greater than the flow velocity around the wing, then three flows will meet in the tridimensional space at the end of the wing as a result of the pressure differential of the new flow and those above and below the wing.

One flow is the flow created by the difference in pressure in the new flow and the pressure on the upper surface of the wing. Since the pressure in the new flow is lower/due to the higher velocity/than that on the upper surface of the wing, this movement will be directed outwards towards the wing tip. When these two motions meet, a vortex will form with an inward to outward direction of rotation /FIG. 4/.

The second flow is the flow created by the higher pressure in the lower surface of the wing and the pressure in the newly created flow at the wing tip. This movement will be directed outwards and will meet the new flow which is of greater velocity and lower pressure. These two flows will form a vortex that will be outboard of the wing tip and will have an outward direction of rotation /FIG. 5/.

As a result of the meeting of the two vortices, a new vortex will form at the wing tip, off to the side of the wing tip, which will be of less intensity, since the two vortices are in opposite directions of rotation /FIG. 6/.

A high velocity flow can be created by a de Laval nozzle placed in a suitable location at the end of the wing. The nozzle is a convergent-divergent tube in which the gas at the inlet contracts, increasing its velocity, then expands and increases its velocity again due to the increase in kinetic energy of the flow on account of the pressure drop in the expanding section /FIG. 7/.

The nozzle should be positioned at both ends of the wing so that the trailing edge of the nozzle is no more than 12% from the nose of the airfoil. According to the authors' research, depending on the angle of attack, this is the range where the aerodynamic effect of the wrap-around is greatest (FIG. 8a), so before this point the gas should start to flow out of the nozzle. On the other hand, if the axis of the nozzle coincides with the chord of the airfoil, its effectiveness will be related to the angle of attack of the wing in flight /FIG. 8b/.

The nozzle so positioned at the wing tip will create the desired airflow with a greater velocity than the wing tip flow rate, reverse the direction of flow on the upper surface of the wing/from inside to outside/and together with the flow from the lower surface will create a vortex at the wing tip, outboard of it, which will be of less intensity due to the opposite directions of rotation of the two vortices /FIG. 9/. The movement of the flow along the upper surface of the wing, from the inside out towards the trailing edge, creates conditions for a better circulation of the whole wing, and therefore a greater lift and less induced drag.

The nozzle parameters/in the narrowing and widening section/should be tailored to the flight characteristics of the given aircraft type to obtain the greatest effect.

Placing the nozzle at both ends of the wing /FIG. 10/does not change its geometry and aerodynamic characteristics, so this approach to reduce induced drag can be applied to older aircraft models without significant modification. On the other hand, the nozzle replaces the winglets, which are more complex to make, that increase the wing area, and thus they induce more aerodynamic drag and more overall weight than the nozzle. Solving the problem of putting a nozzle instead of a winglet is technologically easier to implement due to its simple construction, there is practically no need for technical maintenance, and de Laval's numerous studies on the nozzle allow its easy adaptability to different types of aircraft.

REFERENCES

1. George C. Larson, How Things Work: Winglets, September 2001
2. Maurizio Verrastro, Ignazio Dimino, in Morphing Wing Technologies, 2018, 2.3 Morphing Winglet
3. Pasquale Sforza, in Commercial Airplane Design Principles, 2014 5.7.8 Raked wingtips
4. Jiří Škorpík, FLOW OF GASES AND STEAM THROUGH NOZZLES
5. de Laval nozzle, From Wikipedia, the free encyclopedia
6. de Laval nozzle, Citizendium Discussion

I claim as my invention is:

1. A wing assembly for an aircraft, the wing assembly comprising:
    an airfoil body, the airfoil body comprising a nose, a trailing edge, and a distal tip, the airfoil body defining a chord line that extends between the nose and the trailing edge at the distal tip, the chord line defining a chord length; and
    a nozzle that is coupled to the airfoil body and positioned outboard of the distal tip, the nozzle defining an inlet end and an outlet end, wherein:
        the nozzle is a convergent-divergent tube in which gas at the inlet end contracts and expands at the outlet end during use,
        a longitudinal axis of the nozzle is parallel with the chord line of the airfoil body,
        the outlet end of the nozzle is positioned aft of the nose of the airfoil body,
        the inlet end of the nozzle is positioned forward of the nose of the airfoil body,
        a distance is defined between the nose of the airfoil body at the distal tip and the outlet end of the nozzle, the distance taken along a line that is parallel to the chord line, and the distance is no more than twelve percent of the chord length.

2. The wing assembly of claim 1, wherein a speed of airflow at the distal tip of the wing assembly is greater than a speed of the wing assembly when the wing assembly is in use.

3. The wing assembly of claim 1, wherein the nozzle is a Laval nozzle.

4. The wing assembly of claim 1, wherein the nozzle creates an air current that flows at a speed that is greater than a speed of the wing assembly when the wing assembly is in use.

5. The wing assembly of claim 1, wherein the nozzle is positioned completely outboard of the distal tip of the airfoil body.

6. The wing assembly of claim 1, wherein the nozzle is coupled to the distal tip of the wing assembly.

7. An aircraft comprising:
a fuselage; and
wing assemblies coupled to the fuselage, each wing assembly comprising:
an airfoil body, the airfoil body comprising a nose, a trailing edge, and a distal tip, the airfoil body defining a chord line that extends between the nose and the trailing edge at the distal tip, the chord line defining a chord length; and
a nozzle that is coupled to the airfoil body and positioned outboard of the distal tip, the nozzle defining an inlet end and an outlet end, wherein:
the nozzle is a convergent-divergent tube in which gas at the inlet end contracts and expands at the outlet end during use,
a longitudinal axis of the nozzle is parallel with the chord line of the airfoil body,
the outlet end of the nozzle is positioned aft of the nose of the airfoil body,
the inlet end of the nozzle is positioned forward of the nose of the airfoil body,
a distance is defined between the nose of the airfoil body at the distal tip and the outlet end of the nozzle, the distance taken along a line that is parallel to the chord line, and
the distance is no more than twelve percent of the chord length.

8. The aircraft of claim 7, wherein the nozzle is a Laval nozzle.

9. The aircraft of claim 7, wherein a speed of airflow at the distal tip of each of the wing assemblies is greater than a speed of the wing assemblies when the wing assemblies are in use.

10. The aircraft of claim 7, wherein each nozzle creates an air current that flows at a speed that is greater than a speed of the wing assemblies when the wing assemblies are in use.

11. The aircraft of claim 7, wherein each nozzle is positioned completely outboard of the distal tip of the respective airfoil body.

12. The aircraft of claim 7, wherein each nozzle is coupled to the distal tip of the respective wing assemblies.

* * * * *